United States Patent [19]

Schindler et al.

[11] Patent Number: 4,595,503
[45] Date of Patent: Jun. 17, 1986

[54] ULTRAFILTRATION MEMBRANE OF POLYAMIDE

[75] Inventors: Erich Schindler, Aschaffenburg; Franz Maier, Obernburg, both of Fed. Rep. of Germany

[73] Assignee: Akzo NV, Arnhem, Netherlands

[21] Appl. No.: 659,072

[22] Filed: Oct. 10, 1984

Related U.S. Application Data

[63] Continuation-in-part of Ser. No. 285,136, Jul. 20, 1981, Pat. No. 4,482,514.

[30] Foreign Application Priority Data

Jul. 25, 1980 [DE] Fed. Rep. of Germany ....... 3028213

[51] Int. Cl.$^4$ .............................................. B01D 39/00
[52] U.S. Cl. .................................. 210/500.38; 264/41
[58] Field of Search ....................... 264/41, 184, 210.1, 264/210.5, 288.8, 289.3; 425/66; 427/172, 244; 210/500.2

[56] References Cited

U.S. PATENT DOCUMENTS 3,615,024 10/1971 Michaels ....................... 210/500.2 X
3,876,738 4/1975 Marinaccio et al. ................... 264/41
4,203,847 5/1980 Grandine, 2nd .................. 264/41 X
4,340,481 7/1982 Mishiro et al. ..................... 210/500.2

FOREIGN PATENT DOCUMENTS 2845797 5/1979 Fed. Rep. of Germany.

Primary Examiner—Evan K. Lawrence
Attorney, Agent, or Firm—Michael J. Striker

[57] ABSTRACT

A membrane is disclosed of polyamide, a copolyamide or a mixture of polyamides, suitable for ultrafiltration and composed of an ultrafiltration skin and a backing layer. The pore size in the backing layer increases with distance from the ultrafiltration skin. The membrane is prepared by dissolving a polyamide in at least 75% formic acid, applying a casting solution, containing about 12-22% by weight polyamide and about 1-7% by weight polyethylene glycol in formic acid which has been brought to a temperature of below about 18° C., as a thin layer onto a carrier foil resistant to the components of the solution, introducing the casting solution on the carrier foil into a precipitation and washing bath, withdrawing the casting solution as a coagulated and washed membrane from the carrier foil, stretching in at least one direction and subsequently drying this coagulated and washed membrane.

3 Claims, 6 Drawing Figures

ULTRAFILTRATION MEMBRANE OF POLYAMIDE

This application is a continuation-in-part of application Ser. No. 285,136, filed on July 20, 1981, U.S. Pat. No. 4,482,514.

BACKGROUND OF THE INVENTION

The invention concerns a flat membrane of polyamide, copolyamide or of a mixture of polyamides, suitable for ultrafiltration and composed of an ultrafiltration skin and a protective layer.

Hollow fiber membranes of polyamide are known from U.S. Pat. No. 4,340,481, which are cast, for example, from a casting solution containing 15 to 25% by weight polyamide dissolved in formic acid. Core-forming substances, as those explained and described in U.S. Pat. No. 4,340,481 (Col. 6, lines 29–54) acting as pore-formers, for example, metal salt, are added to this solution. After the casting, the cast solution is led into a coagulation bath. After the finish of coagulation, the core-forming substances are washed out whereby the desired pores of the membrane are produced. This known membrane has the form of a hollow fiber and displays moreover, a web of fine filter canals distributed uniformly over the cross-section of the membrane. This known membrane does not display an ultrafiltration skin. Moreover, these membranes display very differing pore sizes. From the pore distribution curve according to FIG. 7 of U.S. Pat. No. 4,340,481 is to be recognized, namely, that compared to the average pore size, pores are contained in the membrane with substantially greater dimensions. As a result, upon employment of this membrane, no sharp separation is obtained during the ultrafiltration.

A microporous membrane is described in U.S. Pat. No. 3,876,738, which is manufactured from a solution which contains polyamide dissolved in formic acid. A relatively higher portion of a non-solvent for polyamide must still be added to this solution. The membrane displays no ultrafiltration skin, and the pore size is supposed to be uniform across the cross-section of the membrane.

A flat, anisotropic membrane without ultrafiltration skin, suitable for ultrafiltration, is known from DE-OS No. 28 45 797. A casting solution, which can be composed of polyamide dissolved in formic acid, must be purposely decomposed before the casting. Upon employment of the polyamide dissolved in formic acid, is provided for the membrane prepared therefrom a low exclusion limit for molecular weight between 300 and 2000. In order to make the membrane suitable for larger molecular weights, another solvent must be employed. According to DE-OS No. 28 45 797, formic acid is thus, not suitable as a solvent for the preparation of membranes with higher exclusion limits.

SUMMARY OF THE INVENTION

It is therefore an object according to the present invention to make available a flat membrane suitable for ultrafiltration and composed of an ultrafiltration skin and a protective layer. The pore distribution, with regard to the pore size, should be narrowly limited with this membrane, so that the membrane possesses a sharp separation limit upon ultrafiltration. Moreover, this membrane should display a high exclusion limit for molecular weights of more than 10,000.

This object is attained according to the present invention by means of a flat membrane of a polyamide, a copolyamide or of a mixture of polyamides, suitable for ultrafiltration and composed of an ultrafiltration skin and a protective layer, the pore size in the protective layer increasing with distance from the ultrafiltration skin, prepared by dissolving the polyamide or polyamides in at least 75% formic acid, by applying a casting solution, which contains about 12–22% by weight polyamide and about 1–7% by weight polyethylene glycol in formic acid, and is brought to a temperature below about 18° C., as a thin layer onto a carrier foil resistant to the solution components, by introducing the casting solution on the carrier foil into a precipitation and washing bath, by withdrawing the casting solution as a coagulated and washed membrane from the carrier foil, by stretching the membrane in at least one direction and subsequently drying of this coagulated and washed membrane.

A membrane according to the present invention, the stretching of which has followed in a ratio from 1.5:1 up to 2.5:1, particularly well solved the object according to the present invention.

The membrane, particularly suitable for ultrafiltration is one in which the drying has been effected so that the membrane is initially heated to about 130° C. and then is finish-dried at 60° up to 80° C.

The membranes according to the present invention display an ultrafiltration efficiency from about 50 up to 20,000 l/m² hbar.

It has been found that polyamide membranes with higher exclusion limits can be prepared even without core-forming substances acting as pore-formers, from solutions of polyamide in formic acid. The viscosity of castable solutions must be relatively high, which thereby leads to the situation that only solutions with high polyamide concentrations are suitable for the preparation of cast membranes. This leads, however, to very small pores in widely-spaced distribution, and very low ultrafiltration efficiencies, useful for no known purpose. In order to obtain useful pore sizes and pore numbers so as to guarantee sufficient ultrafiltration efficiency, the polyamide concentration of the solution must accordingly, be so strongly lowered, that it can no longer be cast.

The pore size within such membranes deviates only in a small extent from the average pore size. The size of the largest pores is about 1.3 up to 1.9 times as large as the average size of all of the present pores according to the invention.

Membranes according to the present invention are characterized by their process of production. The process for production of these membranes is distinguished in that as a casting solution, 12 to 22% by weight and 1 to 7% by weight polyethylene glycol, always relative to the prepared casting solution in at least 75% (by weight) formic acid is employed, and that the solution, brought to a temperature of below 18° C. is applied to a carrier foil, led through a precipitation and washing bath moving in counterstream to the carrier foil, after leaving the bath discharging the applied solution form the carrier foil as a coagulated and washed membrane, stretching the discharged membrane in at least one direction to a ratio of 1.5:1 up to 2.5:1, and subsequently drying the membrane.

Stretching of the membrane will increase its strength and allow adjustment of the pore size. It has proven particularly helpful to stretch the membrane over the so-called drawing rod. Particularly good results are achieved when the drawing rod has been uniformly been heated to a temperature of about 130° C. to 140° C.

Expediently, the membrane is initially heated to about 130° C., while inhibiting any longitudinal and/or latitudinal contraction, for thermal fixation with simultaneous pre-drying and then finish-drying follows at from 60° up to 80° C. Prevention of longitudinal and latitudinal contraction may be achieved by placing the foil onto a conveyor band, heated rollers or the like.

According to a preferred embodiment of the invention, formic acid having a minimum concentration of about 80% is employed for preparation of the solution. Suitable ultrafiltration rates are then obtained when one uses as a solution one with about 12-22% polyamide in formic acid with a minimum concentration of 75%.

Membranes with particularly suitable pore sizes and ultrafiltration rates are obtained when using solutions containing about 14-20% polyamide in formic acid having a minimum concentration of 75%.

In principle, all polyamides, copolyamides or their mixtures which are soluble in formic acid and which, with the addition of polyethylene glycol, will result in a castable solution are suitable for the process of the present invention. Proven to be particularly suitable are, for example, Nylon 6, Nylon 6.6, or copolymer of a polyamide, prepared for instance from AH-salt and ε-caprolactam. Addition of about 2 to 5% polyethylene glycol to the solution has proven suitable herein. It has also proven to hold the temperature of the solution, or the temperature of the coagulating and washing bath, to below 15° C. In order to enhance formation of the skin, it is advantageous to allow for a dwell period of at least two seconds in the ambient air.

The membrane suitable for ultrafiltration, prepared according to the abovedescribed process, is distinguished by being composed of an ultrafiltration skin and a backing layer, whereby the size of the pores in the backing layer increases with the distance from the ultrafiltration skin. The ultrafiltration membranes according to the present invention have a thickness which lies as a rule between 10 and 300 $\mu$m. Preference is given to ultrafiltration membranes with a thickness of from 20 up to 150 $\mu$m.

The filtration characteristics are determined with dextrane of various average molecular weights in aqueous solutions (5%). Equipment: Amicon-TCF 10, 1 bar pressure at 25° C.

A membrane with an ultrafiltration rate of 50 l/m$^2$ hbar will still retain 95% of dextrane with with a molecular weight of 20,000; a membrane with an ultrafiltration rate of 347 l/m$^2$ hbar will retain 85% of dextrane with a molecular weight of 64000; and a membrane with an ultrafiltration rate of 13,800 l/m$^2$ hbar will retain 2% of dextrane with a molecular weight of 2 million.

In membranes having a high ultrafiltration weight, the pore size may be determined by the so-called bubble point method, wherein air of 22° C. is blown through an alcohol-wet filter (ASTM method F 316-70 [1976]). For a membrane with an ultrafiltration rate of 13,800 l/m$^2$ hbar, a pore size of 300 nm is thus determined, and a pore size of 500 nm for an ultrafiltration rate of 19.80 l/m$^2$ hbar.

The novel features which are considered characteristic for the invention are set forth in particular in the appended claims. The invention itself, however, both as to its construction and its method of operation, together with additional objects and advantages thereof, it will be best understood from the following description of specific embodiments when read in conjunction with the accompanying drawings.

DESCRIPTION OF THE PREFERRED EMBODIMENTS

Figure 1:
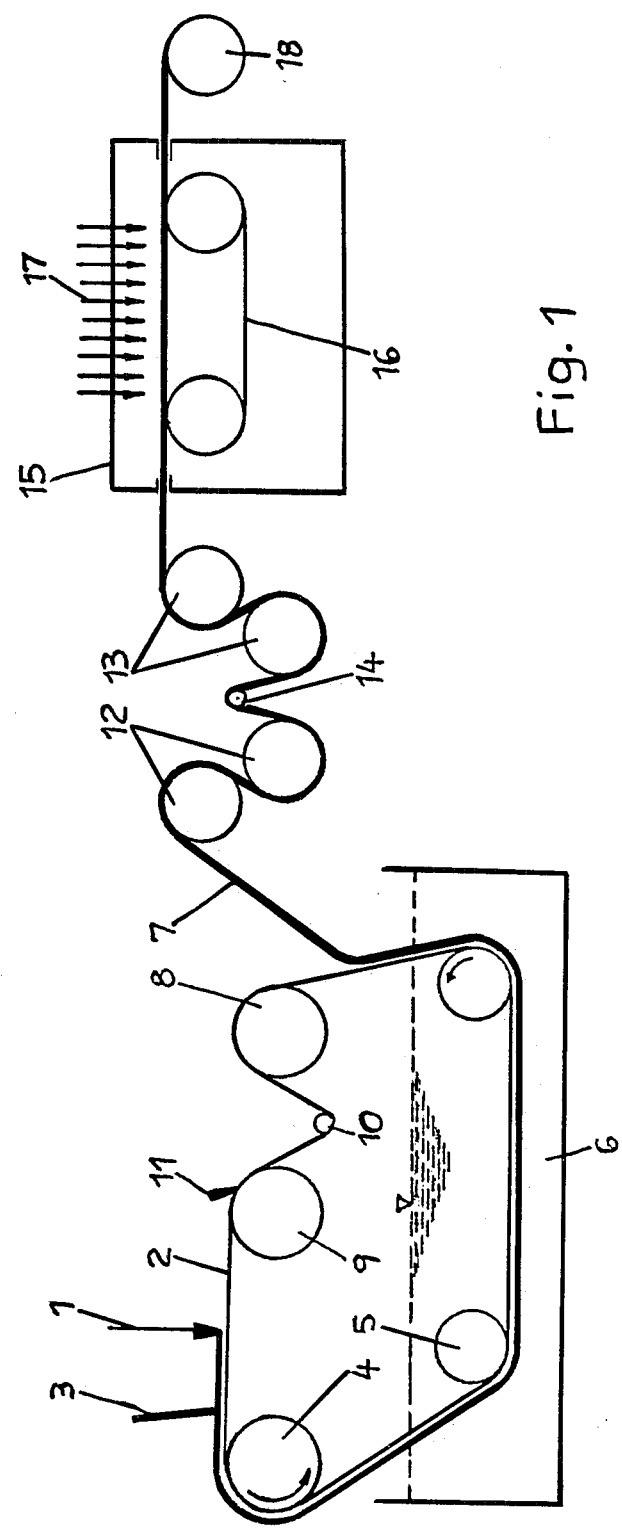
FIG. 1 is a schematic representation of an arrangement for producing, by a process according to the invention, the membranes as enumerated in the examples.

Four different solutions 1 are prepared and applied with an applicator according to known techniques, not needing to be further shown herein, onto a dry carried film 2 of polyester, and spread thereon by means of a squeegee 3. The data required for production by the process according to the invention are shown in Table I for these four different solutions. After a dwell time of a few seconds, e.g., 2 seconds, in ambient air, the solution is immersed with the aid of carrier film 2 and rollers 4 and 5 into a coagulating and washing bath 6. Water is used as coagulating and washing fluid, the water quantity of the reverse flow being so adjusted that concentration of formic acid at the drain of the coagulating and washing bath does not exceed 35%, with the preferred value being 10%. The temperature of the solution and of the coagulating and washing fluid are held to 13° C.

Subsequent to drawing the meanwhile formed membrane 7 out of the coagulating and washing bath 6, membrane 7 is stripped from carrier film 2. Carrier film is returned over rollers 8 and 9 and take-up pulley 10 to the applicator 1, with a scraper 11 serving to clean the film of dirt particles and to dry it.

The still-wet membrane 7 is conducted to a drawing section consisting of the roller pairs 12 and 13 and the drawing rod 14. The membrane is stretched to a ratio of 2:1 over the drawing rod 14 which has been uniformly heated to a temperature of 130° C. The still-wet membrane 7 is subsequently conducted into a dryer 15, and then it is deposited upon a conveyor band 16 in order to prevent longitudinal and lateral shrinkage. The membrane is then initially heated by means of air blower 17 to about 130° C., with finish-drying of the membrane proceeding at temperatures of about 70° C. After exiting from dryer 15, the membrane is reeled onto a spool 18.

The characteristic values for the membranes prepared according to this process are summarized in Table II.

As is seen from Table II, the membranes according to the present invention display an extraordinarily high exclusion limit compared to the known membranes.

Figure 2:
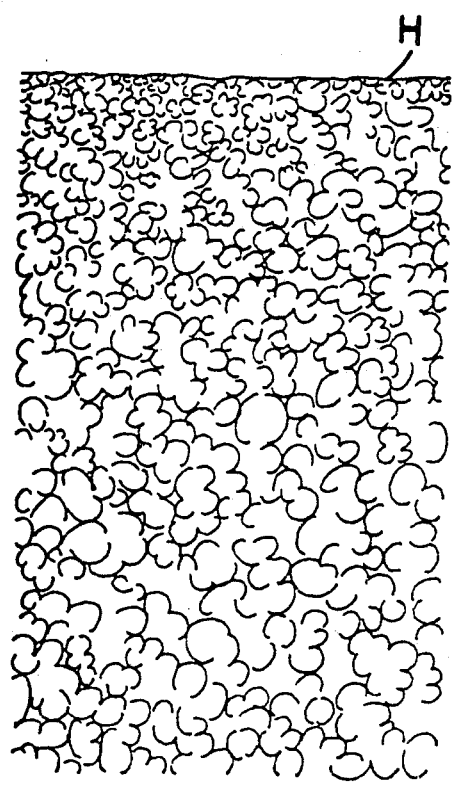
FIG. 2 is an enlarged cross-section of an ultrafiltration membrane prepared from Nylon 6.
Figure 3:
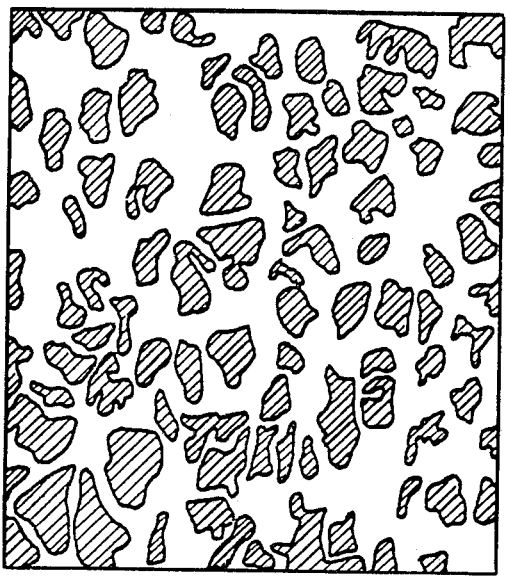
FIG. 3 is an enlarged representation of the surface, formed by the backing layer, of the membrane from FIG. 2, having an ultrafiltration rate of 347 l/m$^2$ hbar.
Figure 4:
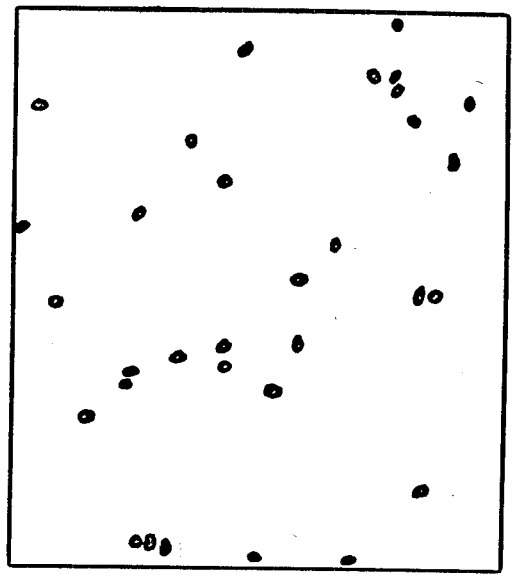
FIG. 4 is an enlarged representation of the surface, formed by the ultrafiltration skin, of the membrane from FIG. 2, having an ultrafiltration rate of 347 l/m$^2$ hbar.

The membrane prepared from solution I (according to Table I) is represented in FIGS. 2, 3 and 4.

FIG. 2 shows in schematic representation, the enlarged cross-section of this ultrafiltration membrane with an ultrafiltration skin H and a backing layer. The pore size of the ultrafiltration membrane increases with the distance from the ultrafiltration skin, whereby however, no considerably larger pores occur, so that a relatively sharp separation is guaranteed upon employment of this membrane for ultrafiltration. The entire thickness of the membrane is 30 μm as listed in Table II. The largest pores are about 1.6 times as great as the average size of all the pores.

FIG. 3 shows the surface of the backing layer of the ultrafiltration membrane, located opposite to the ultrafiltration skin.

FIG. 4 shows the surface of the ultrafiltration skin of this ultrafiltration membrane, having an ultrafiltration rate of 347 l/m² hbar.

Figure 5:
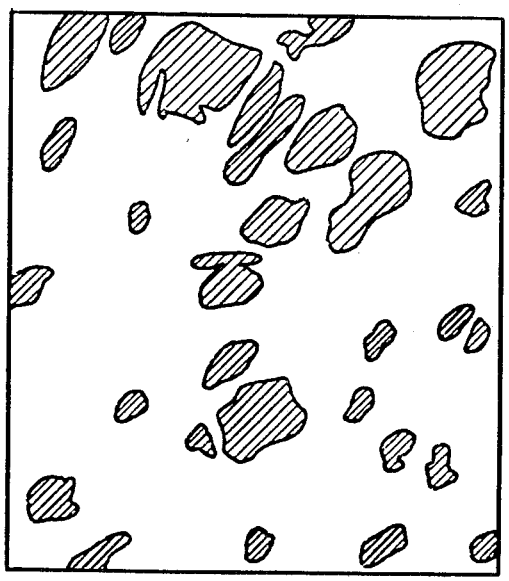
FIG. 5 is an enlarged representation of the surface, formed by the backing layer, of a membrane having an ultrafiltration rate of 13,800 l/m$^2$ hbar.
Figure 6:
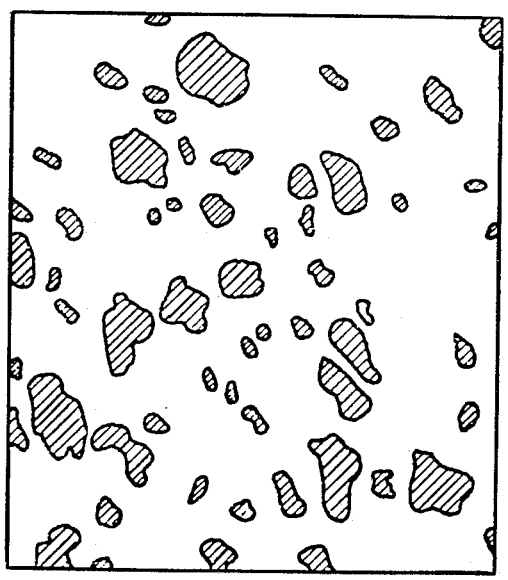
FIG. 6 is an enlarged representation of the surface, formed by the ultrafiltration skin, of a membrane having an ultrafiltration rate of 13,800 l/m$^2$ hbar.

FIGS. 5 and 6 show the surfaces of an ultrafiltration membrane produced from solution IV (Table I), with FIG. 5 representing the surface of the backing layer and FIG. 6 representing the surface of the ultrafiltration skin with an ultrafiltration rate of 13,800 l/m² hbar (according to Table II).

In FIGS. 3 through 6, the surfaces represented by the formed pores are hatched.

It will be understood that each of the elements described above, or two or more together, may also find a useful application in other types of membranes different from the types described above.

While the invention has been illustrated and described as embodied in an ultrafiltration membrane of polyamide, it is not intended to be limited to the details shown, since various modifications and structural changes may be made without departing in any way from the spirit of the present invention.

Without further analysis, the foregoing will so reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. Flat membranes of a polyamide, a copolyamide or a mixture of polyamides, suitable for ultrafiltration and comprising an ultrafiltration skin and a porous backing layer, the pore size in said backing layer increasing with distance from said ultrafiltration skin, produced by dissolving the polyamide in at least 75% concentration formic acid, applying said casting solution, containing about 12–22% by weight polyamide and 1–7% by weight polyethylene glycol in formic acid and brought to a temperature of below about 18° C., as a thin layer onto a carrier foil resistant to the solution components, introducing said casting solution on said casting foil into a precipitation and washing bath, withdrawing said casting solution as a coagulated and washed membrane from said carrier foil, stretching said coagulated and washed membrane in at least one direction to a ratio from 1.5:1 up to 2.5:1 and subsequently drying said coagulated and washed membrane.

2. The membrane according to claim 1, produced with said drying effected by initially heating the membrane to about 130° C. and then finish-drying at temperatures between 60° and 80° C.

3. The membrane according to claim 1, having an ultrafiltration efficiency from about 50 up to 20,000 l/m² hbar.

TABLE I

| Solution Run No. | Polyamide/6 Concentration % by weight | Avge. Molecular Wt. of Polyamide/6 Mn | Polyethylene glycol concentration Gew. % | Avge. Molecular Wt. of Polyethylene glycol Mn | Applied layer Thickness of Solution μm | Dwell Period in Air s | Dwell Period in Coagulation and Washing Bath s |
|---|---|---|---|---|---|---|---|
| I | 20 | 35,000 | 2 | 600 | 100 | 5 | 120 |
| II | 16 | 35,000 | 3.2 | 600 | 150 | 5 | 120 |
| III | 14 | 20,100 | 4.2 | 600 | 150 | 5 | 120 |
| IV | 14 | 20,100 | 4.2 | 2,000 | 150 | 5 | 120 |

TABLE II

| Solution Run No. | Ultrafiltration Efficiency l/m² h bar | Thickness of Membrane μm |
|---|---|---|
| I | 347 | 30 |
| II | 1,200 | 73 |
| III | 10,000 | 41 |
| IV | 13,800 | 70 |